United States Patent [19]

Nakamura et al.

[11] Patent Number: 5,293,779
[45] Date of Patent: Mar. 15, 1994

[54] DETECTING CIRCUIT FOR DETECTING AN ABNORMAL STATE IN A VIBRATING GYROSCOPE

[75] Inventors: Takeshi Nakamura; Akira Mori, both of Nagaokakyo, Japan

[73] Assignee: Murata Manufacturing Co., Ltd., Nagokakyo, Japan

[21] Appl. No.: 802,671

[22] Filed: Dec. 5, 1991

[30] Foreign Application Priority Data

Dec. 11, 1990 [JP] Japan .................. 2-410294

[51] Int. Cl.$^5$ .................. G01P 9/04; G01P 21/00
[52] U.S. Cl. .................. 73/505; 73/1 D
[58] Field of Search ............ 73/504, 1 D, 1 DV, 505, 73/2

[56] References Cited

PUBLICATIONS

JEE Journal of Electronic Engineering vol. 27, No. 285, Sep. 1990, Tokyo, JP pp. 99–104, T. Nakamura, "Vibration Gyroscope Employs Piezoelectric Vibrator".

Primary Examiner—John E. Chapman
Assistant Examiner—Helen Kwok
Attorney, Agent, or Firm—Armstrong, Westerman, Hattori, McLeland & Naughton

[57] ABSTRACT

A detecting circuit 10 has two diodes 16a and 16b for rectifying an oscillation signal for driving a vibrator of a vibrating gyroscope and a detection signal for detecting a rotary angular velocity of the vibrator in the directions reverse to each other. The diodes 16a and 16b are connected with two resistors 20a and 20b for composing these rectified signals. A connection point 21 of the resistors 20a and 20b is connected to a base of a PNP transistor 22. The emitter of the transistor 22 is connected to a positive potential and a collector thereof is grounded through a resistor Further, to the collector of the transistor 22, an output terminal 28 is connected.

7 Claims, 3 Drawing Sheets

F I G. 1
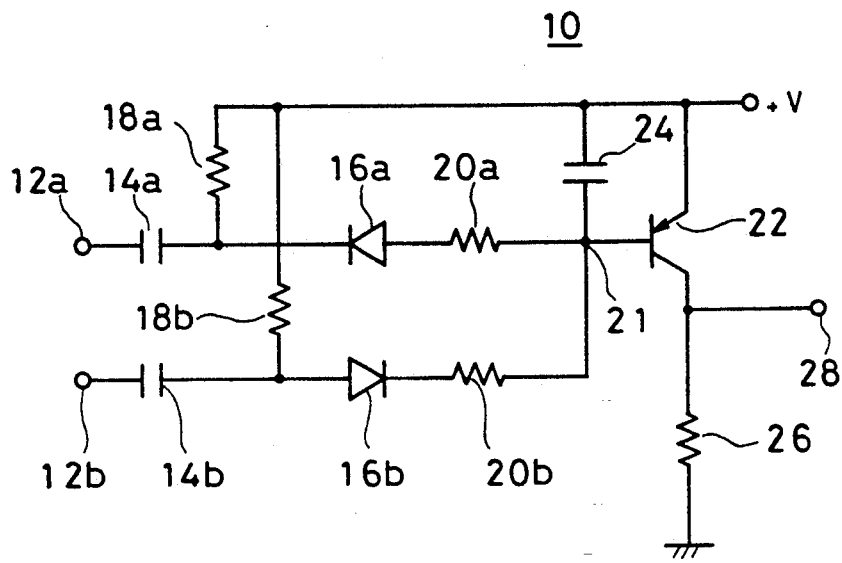

OSCILLATION SIGNAL

DETECTION SIGNAL  0

OUTPUT SIGNAL  H
L

OSCILLATION SIGNAL

DETECTION SIGNAL  0

OUTPUT SIGNAL  H
L

FIG. 5

| | | |
|---|---|---|
| OSCILLATION SIGNAL | | ———— |
| DETECTION SIGNAL | 0 | ———— |
| OUTPUT SIGNAL | H<br>L | ————  |

DETECTING CIRCUIT FOR DETECTING AN ABNORMAL STATE IN A VIBRATING GYROSCOPE

BACKGROUND OF THE INVENTION

1. Field of the Invention

The present invention relates to a detecting circuit, and specifically relates to a detecting circuit capable of detecting an abnormal state of a vibrating gyroscope.

2. Description of the Prior Art

FIG. 2 is a block diagram showing an example of a conventional vibrating gyroscope, which is the background of the present invention and whereto the present invention is applied. In the vibrating gyroscope 1, piezoelectric elements 3a and 3b for driving and detecting are formed on two side surfaces of a triangular prism-shaped vibrator 2, and a piezoelectric element 4 for feedback is formed on the other one side of the vibrator 2.

The piezoelectric element 4 for feedback is connected to the piezoelectric elements 3a and 3b through an oscillation circuit 5 and a phase-shifting circuit 6. Further, the piezoelectric elements 3a and 3b are connected to two input terminals of a differential amplifier circuit 7 consisting of, for example, a differential amplifier, respectively. Also, an output terminal of the differential amplifier circuit 7 is connected to an input terminal of a synchronous detection circuit 8 The phase-shifting circuit 6 is connected to the synchronous detection circuit 8 to detect an output of the differential amplifier circuit 7 in synchronism with a driving signal of the vibrator 2. Further, an output terminal of the synchronous detection circuit 8 is connected to a rectifying/amplifying circuit 9 for rectifying and amplifying an output of the synchronous detection circuit 8.

In the vibrating gyroscope 1 as shown in FIG. 2, the vibrator 2 is driven by self-excited vibration by a feedback loop such as the oscillation circuit 5 and the phase-shifting circuit 6. In this case, the two piezoelectric elements 3a and 3b generate similar sine wave signals. Consequently, output voltages of the differential amplifier circuit 7, the synchronous detection circuit 8 and the rectifying/amplifying circuit 9 become nearly 0 V, respectively.

Here, when the vibrator 2 is rotated around the shaft thereof, in response to the rotary angular velocity of the vibrator 2, the voltage of the sine wave signal generated in one of the two piezoelectric elements 3a and 3b becomes large, and the voltage of the sine wave signal generated in the other one becomes small. Consequently, a sine wave signal of a magnitude responding to the rotary angular velocity of the vibrator 2 is outputted from the differential amplifier circuit 7 Then, the sine wave signal outputted from the differential amplifier circuit 7 is synchronized-detected by the synchronous detection circuit 8, and is rectified and amplified by the rectifying/amplifying circuit 9. Accordingly, the vibrating gyroscope 1 can detect the rotary angular velocity by the output voltage from the deferential amplifier circuit 7, the synchronous detection circuit 8 or the rectifying/amplifying circuit 9. For this reason, the vibrating gyroscope 1 is used, for example, for attitude control of a motorcar However, in the case where the vibrating gyroscope 1 of FIG. 2 is used, for example, for attitude control of a motorcar, the attitude control of the motorcar is required to be performed only after making sure that the vibrating gyroscope 1 is operated in normal state Because, for example, when the vibrating gyroscope is operated in an abnormal state such that a connection line connected to each piezoelectric element is disconnected or short-circuited, an abnormal signal is outputted from the vibrating gyroscope, and when the abnormal signal is used intact as a signal for control, a dangerous state sometimes takes place

SUMMARY OF THE INVENTION

Therefore, a principal object of the present invention is to provide a detecting circuit which can detect an abnormal state of a vibrating gyroscope.

The present invention is directed to a detecting circuit for detecting an abnormal state in a vibrating gyroscope which generates an oscillation signal for driving a vibrator and a detection signal for detecting a rotary angular velocity of the vibrator, which comprises a first rectifying means for rectifying the oscillation signal, a second rectifying means for rectifying the detection signal in the direction reverse to the oscillation signal rectified by the first rectifying means, a composite means for composing the oscillation signal rectified by the first rectifying means and the detection signal rectified by the second rectifying means, and a switching device which is switched by a composite signal composed by the composite means.

The oscillation signal of the vibrating gyroscope is rectified by the first rectifying means. Also, the detection signal of the vibrating gyroscope is rectified by the second rectifying means in the direction reverse to the oscillation signal rectified by the first rectifying means Then, the oscillation signal and the detection signal which have been rectified by the first rectifying means and the second rectifying means are composed by the composite means The switching device is switched by the composite signal composed by the composite means On the other hand, the oscillation signal or the detection signal of the vibrating gyroscope when the vibrating gyroscope is operated in normal state differs from that when the vibrating gyroscope is operated in an abnormal state.

Accordingly, the composite signal composed by the composite means of the detecting circuit when the vibrating gyroscope is operated in normal state differs from that when the vibrating gyroscope is operated in an abnormal state, and ON/OFF state of the switch device also differs For this reason, the detecting circuit can detect an abnormal state of the vibrating gyroscope from ON/OFF state of the switching device.

In accordance with the present invention, a detecting circuit is obtainable which can detect an abnormal state of a vibrating gyroscope.

The above and other objects, features, aspects and advantages of the present invention will become more apparent from the following detailed description of the embodiments with reference to the accompanying drawings.

BRIEF DESCRIPTION OF THE DRAWINGS

FIG. 1 is a circuit diagram showing an embodiment of the present invention.

FIG. 5 is a graph showing an oscillation signal and a detection signal of the vibrating gyroscope and an output signal of the detecting circuit when the vibrating gyroscope is operated in another abnormal state in the case where the detecting circuit as shown in FIG. 1 is connected to the vibrating gyroscope as shown in FIG. 2.

DESCRIPTION OF THE PREFERRED EMBODIMENTS

Figure 2:
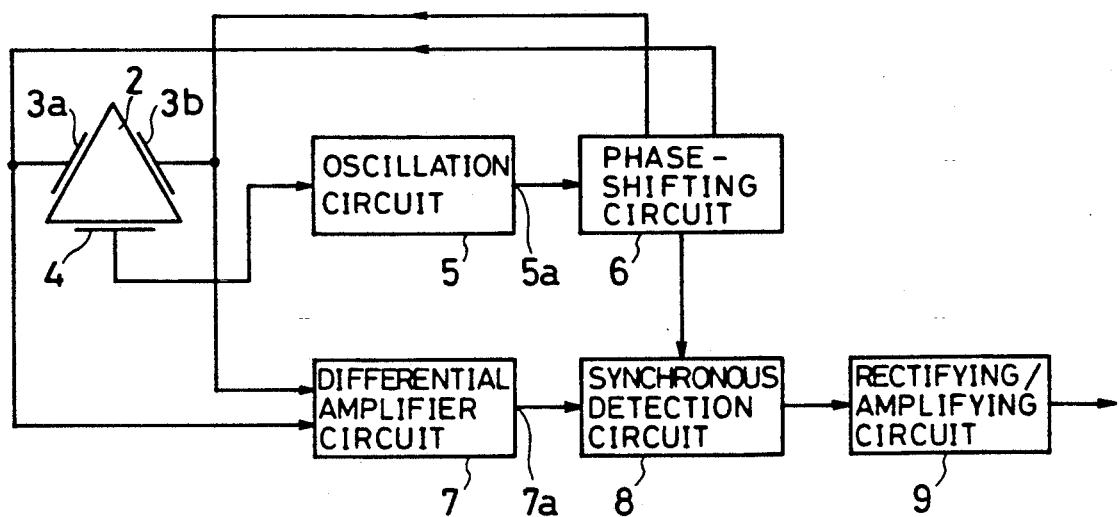
FIG. 2 is a block diagram showing an example of a conventional vibrating gyroscope, which is the background of the present invention and whereto the present invention is applied.

FIG. 1 is a circuit diagram showing an embodiment of the present invention. A detecting circuit 10 comprises two input terminals 12a and 12b.

One input terminal 12a is for inputting an oscillation signal of a vibrating gyroscope, and is connected to a cathode of a diode 16a as a first rectifying means through a capacitor 14a. The diode 16a is for rectifying an oscillation signal of the vibrating gyroscope. The cathode of the diode 16a is connected to a positive potential through a resistor 18a.

Also, the other input terminal 12b is for inputting a detection signal of the vibrating gyroscope, and is connected to an anode of a diode 16b as a second rectifying means through a capacitor 14b. The diode 16b is for rectifying a detection signal of the vibrating gyroscope in the direction reverse to the oscillation signal of the vibrating gyroscope rectified by the diode 16a. The anode of the diode 16b is also connected to the positive potential through a resistor 18b.

Furthermore, an anode of the diode 16a and a cathode of the diode 16b are connected through two resistors 20a and 20b as a composite means. These resistors 20a and 20b are for composing the oscillating signal and the detection signal of the vibrating gyroscope rectified by the diodes 16a and 16b. This means that these resistors 20a and 20b are for generating a composite signal composed with the rectified oscillation signal and detection signal at a connection point 21 thereof.

Also, the connection point 21 of these resistors 20a and 20b is connected, for example, to a base of a PNP transistor 22 as a switching device Further, the base of the transistor 22 is connected to the positive potential through a capacitor 24. The capacitor 24 is for stably keeping a base potential of the transistor 22 Also, a emitter of the transistor 22 is connected to the positive potential. Further, a collector of the transistor 22 is grounded through a resistor 26. Accordingly, the transistor 22 is put in ON state when the base potential thereof is low, and put in OFF state when the base potential thereof is high.

Furthermore, to the collector of the transistor 22, an output terminal 28 is connected. Accordingly, the output terminal 28 goes high when the transistor 22 is in ON state, that is, when a collector current flows, and goes low when the transistor 22 is in OFF state, that is, when the collector current scarcely flows.

Next, description is made on operation and the like of the detecting circuit 10 taking the case of connecting the detecting circuit 10 to the vibrating gyroscope I as shown in FIG. 2 as an example. In this case, the input terminals 12a and 12b of the detecting circuit 10 are connected to the output terminal 5a of the oscillation circuit 5 and the output terminal 7a of the differential amplifier circuit 7 of the vibrating gyroscope 1, respectively.

Figure 3:
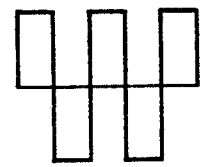
FIG. 3 is a graph showing an oscillation signal and a detection signal of the vibrating gyroscope and an output signal of a detecting circuit when the vibrating gyroscope is operated in normal state in the case where the detecting circuit as shown in FIG. 1 is connected to the vibrating gyroscope as shown in FIG. 2.
Figure 3:
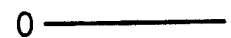
Figure 3:
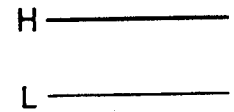

In the detecting circuit 10, the oscillation signal of the vibrating gyroscope is rectified in the forward direction of the transistor 22 by the diode 16a. Also, the detection signal of the vibrating gyroscope 1 is rectified in the reverse direction by the diode 16b. Further, the rectified Oscillation signal and detection signal are composed by the two resistors 20a and 20b. Then, the resulting composite or combined signal is applied to the base of the transistor 22.

Where the vibrating gyroscope 1 is operated normally, as shown in FIG. 3, the voltage of the oscillation signal from the oscillation circuit 5 for driving the vibrator 2 is large and outputs of piezoelectric elements 3a and 3b for detection are balanced with each other, and therefore the voltage of the detection signal from the differential amplifier circuit 7 for detecting the rotary angular velocity of the vibrator 2 is small. Consequently, the potential of the composite signal between the two resistors 20a and 20b is low, and the base potential of the transistor 22 is also low. Accordingly, the transistor 22 is put in ON state, and the output terminal 28 goes high.

Figure 4:
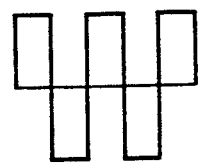
FIG. 4 is a graph showing an oscillation signal and a detection signal of the vibrating gyroscope and an output signal of the detecting circuit when the vibrating gyroscope is operated in an abnormal state in the case where the detecting circuit as shown in FIG. 1 is connected to the vibrating gyroscope as shown in FIG. 2.
Figure 4:
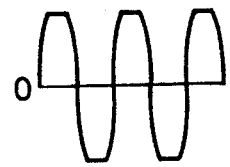
Figure 4:

On the other hand, in the vibrating gyroscope 1, in the case of an abnormal state where one of connection lines from the piezoelectric elements 3a and 3b to the differential amplifier circuit 7 is disconnected or short-circuited, an imbalance takes place between the outputs of the piezoelectric elements 3a and 3b for detection, and therefore, as shown in FIG. 4, the detection signal of the vibrating gyroscope 1 becomes large. Consequently, the potential Of the composite signal and the base potential of the transistor 22 go high, and the transistor 22 is put in OFF state, and the output terminal 28 goes low.

Also, in the vibrating gyroscope 1, in the case of an abnormal state where the connection line from the piezoelectric element 4 to the oscillation circuit 5 is disconnected or short-circuited, or both connection lines from the phase-shifting circuit 6 to the piezoelectric elements 3a and 3b are disconnected or short-circuited, oscillation cannot be maintained, and as shown in FIG. 5, no oscillation signal is obtainable. Also, in this case, the potential of the composite signal and the base potential of the transistor 22 go high, and the transistor 22 is put in OFF state, and the output terminal 28 goes low.

Accordingly, the detecting circuit 10 can detect an abnormal state of the vibrating gyroscope 1 by the level of the output terminal 28 or ON/OFF state of the transistor 22.

Furthermore, in the detecting circuit 10 of the embodiment, also in the case where the oscillation circuit 5, the differential amplifier circuit 7 of the vibrating gyroscope 1 connecting it, the power source or the detecting circuit 10 is disconnected, the transistor 22 is put in OFF state, and the output terminal 28 goes low, and therefore these disconnections can also be detected In addition, in the above-described embodiment, the oscillation signal of the vibrating gyroscope is rectified in the forward direction of the transistor, and the detection signal of the vibrating gyroscope is rectified in the direction reverse to the transistor, but in reverse, it is also possible that the detection signal of the vibrating gyroscope is rectified in the forward direction of the transistor, and the oscillation signal of the vibrating gyroscope is rectified in the direction reverse to the transistor. Thus, the ON/OFF state of the transistor of the detecting circuit is reversed and the level of the output terminal thereof is also reversed in normal state and an abnormal state, and an abnormal state of the vibrating gyroscope can be detected from the level of the output terminal or the ON/OFF state of the transistor.

Also, in the above-described embodiment, a PNP transistor is used as a switching device, but an NPN transistor may be used in place of a PNP transistor. Also in this case, the ON/OFF state of the transistor and the level of the output terminal in normal state and an abnormal state of the vibrating gyroscope are reversed respectively, an abnormal state of the vibrating gyroscope can be detected from the level of the output terminal or the state of the transistor.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A detecting circuit for detecting an abnormal state i a vibrating gyroscope which generates an oscillation signal for driving a vibrator and a detection signal for detecting a rotary angular velocity of said vibrator, said detecting circuit comprising:
   a first rectifying means for rectifying said oscillation signal;
   a second rectifying means for rectifying said detection signal in the direction reverse to said oscillation signal rectified by said first rectifying means;
   a composite means, operably coupled to said first and second rectifying means, for combining said oscillation signal rectified by said first rectifying means and said detection signal rectified by said second rectifying means, and for outputting a composite signal; and
   a switching device operably coupled to said composite means, wherein said switching device is switched by said composite signal from said composite means.

2. A detecting circuit in accordance with claim 1, wherein said first rectifying means comprises a diode.

3. A detecting circuit in accordance with claim 1, wherein said second rectifying means comprises a diode.

4. A detecting circuit in accordance with claim 1, wherein said composite means comprises a plurality of resistors connected in series.

5. A detecting circuit in accordance with claim 1, wherein said switching device comprises a transistor.

6. A detecting circuit in accordance with claim 5, wherein said transistor comprises a PNP transistor.

7. A detecting circuit in accordance with claim 5, wherein said transistor comprises an NPN transistor.

* * * * *

UNITED STATES PATENT AND TRADEMARK OFFICE
CERTIFICATE OF CORRECTION

PATENT NO. : 5,293,779
DATED : March 15, 1994
INVENTOR(S) : NAKAMURA ET AL

It is certified that error appears in the above-indentified patent and that said Letters Patent is hereby corrected as shown below:

On the cover page, Item [73], assignee's address "Nagokakyo, Japan" should be --Nagaokakyo, Japan--.

Signed and Sealed this

Fifteenth Day of November, 1994

Attest:

BRUCE LEHMAN

Attesting Officer   Commissioner of Patents and Trademarks